INVENTOR
C. F. KURTH
BY R. B. Ardis
ATTORNEY

United States Patent Office 3,546,701
Patented Dec. 8, 1970

3,546,701

PHASE LOCKED LOOP BILATERAL TRANSMISSION SYSTEM INCLUDING AUXILIARY AUTOMATIC PHASE CONTROL

Carl F. Kurth, Andover, Mass., assignor to Bell Telephone Laboratories, Incorporated, Murray Hill and Berkeley Heights, N.J., a corporation of New York Filed Dec. 27, 1967, Ser. No. 693,904
Int. Cl. H04b 1/56
U.S. Cl. 343—179 7 Claims

ABSTRACT OF THE DISCLOSURE

A bilateral transmission system is disclosed which comprises a transceiver at each end connected by a transmission medium which introduces signficant phase shift to a modulated carrier passing therethrough. One transceiver comprises a phase locked loop and the other transceiver comprises a phase locked loop and an auxiliary control circuit to increase the phase variation tracking range of the other transceiver and of the bilateral transmission system.

CROSS REFERENCE TO RELATED APPLICATIONS

The following are related applications: W. B. Gaunt, Jr., Ser. No. 678,398, filed Oct. 26, 1967; C. F. Kurth, Ser. No. 693,905, filed Dec. 27, 1967; C. F. Kurth-F. J. Witt, Ser. No. 694,012, filed Dec. 27, 1967; C. F. Kurth-R. C. MacLean, Ser. No. 693,967, filed Dec. 27, 1967; C. F. Kurth, Ser. No. 693,906, filed Dec. 27, 1967; C. F. Kurth, Ser. No. 693,922, filed Dec. 27, 1967.

BACKGROUND OF THE INVENTION

This invention relates generally to bilateral transmission systems and, more particularly, to bilateral transmission systems employing a transceiver at each end comprising a phase locked loop.

A frequency modulated bilateral transmission system employing a transceiver at each end comprising a phase locked loop has been set forth in an application by W. B. Gaunt, Jr., Ser. No. 678,398, filed Oct. 26, 1967. The bilateral transmission system disclosed therein may be utilized where the phase shift suffered by the modulated carrier in the transmission medium is negligible. Where significant phase shift is suffered by the modulated carrier in the transmission medium, the operation of the bilateral transmission system may be impaired because of the attendant limited phase variation tracking range and nonlinear performance of each phase locked loop. This degradation in performance is primarily due to the limited loop gain in the phase locked loop. When a bilateral transmission system utilizing a phase locked loop at each end as a transceiver is to be employed in a medium in which there will be significant phase shift, the phase variation tracking range of the bilateral transmission system may be extended by extending the phase variation tracking range of the phase locked loop.

The present invention, although not limited to such an application, may be used for telephone transmission. At present, there is an increasing demand for additional telephones in areas in which there is already an overcrowded condition with regard to telephone lines. These telephone lines extend from a central office to individual subscribers served by the central office. When it is unfeasible to install additional lines in these areas, carrier transmission employing pre-existing lines may be employed. Carrier transmission may also be employed in remote areas where telephone lines exist since it may be less expensive to employ carrier transmission than add additional lines. Where carrier transmission is employed, the telephone lines introduced significant phase shift to the modulated carrier passing therethrough.

The bilateral transmission system employing a phase locked loop as a transceiver at each end may, as discussed above, be employed between a central office and a subscriber. A separate phase locked loop is installed at the central office corresponding to a phase locked loop for each subscriber. Since the distance between the central office and each subscriber may vary, the phase shift suffered by a modulated carrier transmitted to each subscriber will also vary. This variation may be compensated for at the time of installation by auxiliary equipment and complex installation procedures. It would be preferable, though, to provide a telephone receiver which automatically compensates for the phase shift suffered by the modulated carrier in the transmission line.

A phase locked loop includes a voltage controlled oscillator and a phase comparator. The output of the voltage controlled oscillator is phase compared with the modulated carrier received by the phase locked loop. The phase comparator produces an output proportional to the phase difference between the compared signals which is fed to the voltage controlled oscillator to adjust its output frequency. The phase locked loop inherently has a limited phase variation tracking range due to the limited loop gain of the phase locked loop so that it will not be responsive to phase differences exceeding a predetermined value. In addition, the phase locked loop with a product type of phase comparator operates with maximum linearity and amplification when a predetermined phase difference exists between its compared signals. When operating with maximum linearity, the phase comparator enables the phase locked loop to operate more effectively. The phase locked loop employed in the prior art may not be capable of maintaining this optimal predetermined phase difference. It would be desirable, therefore, to provide apparatus in the phase locked loop which automatically maintains this predetermined phase difference independent of the phase shift suffered by the received modulated carrier.

An object of the present invention is to provide a transceiver, similar to a phase locked loop in operation, which can automatically compensate for phase shift suffered through the transmission medium.

Another object of the present invention is to extend the phase variation tracking range of a phase locked loop.

Still another object of the present invention is to maintain the product type phase comparator used in a phase locked loop operating with maximum linearity and amplification.

Another object of the present invention is to provide a bilateral transmission system employing a phase locked loop at one end and a transceiver at the other, where the transmission medium may introduce significant phase shift to the modulated carrier.

Still another object of the present invention is to provide a bilateral transmission system employing a transceiver at each end comprising essentially a phase locked loop which will operate as a substantially linear system.

SUMMARY OF THE INVENTION

The above objects are accomplished by providing a transceiver comprising an oscillator which provides a carrier wave to be modulated by a signal to be transmitted by the transceiver and a phase comparator which compares the output of the oscillator with the modulated carrier received by the transceiver after the output has, in accordance with one feature of the present invention, passed through a phase shifter which is controlled by the output derived from the phase comparator.

In accordance with an additional feature of the present invention, a bilateral transmission system is provided employing a transceiver at one end comprising a standard phase locked loop and a second transceiver at the other comprising a phase locked loop and an auxiliary control circuit. The second transceiver includes a phase comparator and a voltage controlled oscillator, as does the standard phase locked loop. The signal received by the second transceiver is phase compared with the output of its voltage controlled oscillator after the output of the voltage controlled oscillator has, in accordance with another feature of the present invention, passed through a phase shifter. The phase comparator produces an output which is proportional to the phase difference of the compared signals. In accordance with still another feature of the present invention, this output is not initially used to control the voltage controlled oscillator, as is found in the standard phase locked loop, but is used to control the phase shifter in order to compensate for the phase shift suffered by the modulated carrier in the transmission medium. The phase shift added to the output of the voltage controlled oscillator by the phase shifter will be such that a predetermined phase difference will be maintained between the compared signals. In accordance with another feature of the present invention, the auxiliary control circuit is connected between the phase comparator and phase shifter in order to extend the phase variation tracking range of the transceiver as compared to that found in a standard phase locked loop. The auxiliary control circuit may compensate for significant phase deviation and enable the bilateral transmission system of the present invention to be used where the transmission medium adds significant phase shift to a modulated carrier passing therethrough.

In accordance with another feature of the present invention, in the bilateral transmission system which includes the transceiver at one end and a phase locked loop at the other, the phase locked loop maintains frequency synchronism between the voltage controlled oscillators in the transceiver and the phase locked loop. The output from the phase comparator in the phase locked loop is proportional to the phase difference between its compared signals. Since frequency is the mathematical derivative of phase, the output of the phase comparator is proportional to the frequency difference variations between the signals compared. In the phase locked loop of the present bilateral transmission system, the output of the phase comparator is supplied to the voltage controlled oscillator to adjust the frequency of the oscillator so that it is in synchronism with frequency of the modulated carrier received by the phase locked loop.

DETAILED DESCRIPTION

A frequency modulated bilateral transmission system employing a transceiver at each end comprising a phase locked loop has been described in an application by W. B. Gaunt, Jr., Ser. No. 678,398, filed Oct. 26, 1967. When the modulated carrier in the bilateral transmission system suffers significant phase shift through the transmission medium, its operation may be impaired since the phase shift encountered in the transmission medium may exceed the phase variation tracking range of the phase locked loops.

Figure 1:
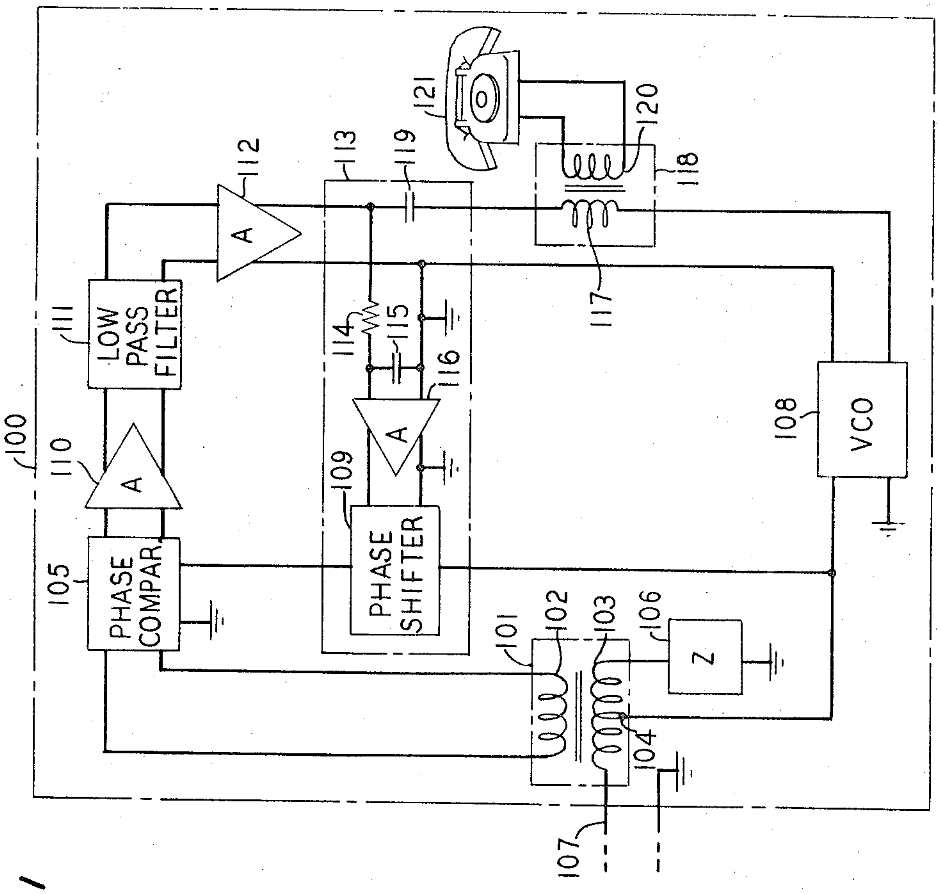
FIG. 1 is a block diagram of a transceiver which is one embodiment of the present invention.

FIG. 1 is a block diagram of a transceiver having an extended tracking range whose operation is similar to a phase locked loop. Transceiver 100 includes hybrid 101 which is used to separate the modulated carriers transmitted and received by transceiver 100. Hybrid 101 comprises primary winding 102 and secondary winding 103 with tapped point 104. Primary winding 102 is connected to phase comparator 105. One end of secondary winding 103 is connected to terminating impedance 106 while the other end is connected to transmission line 107. The secondary winding 103 is tapped at point 104 which is connected to voltage controlled oscillator 108. A voltage controlled oscillator whose frequency output is linearly proportional to its voltage input may be used in the present invention. An example of a voltage controlled oscillator suitable for use in the present invention may be found on p. 67 of "Phaselock Techniques," written by F. M. Gardner and published by John Wiley & Sons, Inc. in 1966. Hybrid 101 provides that the output of voltage controlled oscillator 108 received at tapped point 104 is transferred to transmission line 107 while not being transferred to primary winding 102. In addition, hybrid 101 insures that the signal received by transceiver 100 at secondary winding 103 is transferred to primary winding 102 while not being transferred to voltage controlled oscillator 108. Therefore, the hybrid serves to separate the modulated carrier received from that transmitted by transceiver 100.

The modulated carrier received by transceiver 100 is applied to phase comparator 105 through hybrid 101. The output of voltage controlled oscillator 108, after passing throuhg phase shifter 109, is also applied to phase comparator 105. The output of phase comparator 105 is connected through a series connection of amplifier 110, low pass filter 111, and amplifier 112 to auxiliary control circuit 113. Auxiliary control circuit 113 comprises a filter formed by resistor 114 and capacitor 115, amplifier 116 and phase shifter 109. The ungrounded output of amplifier 112 is connected to one end of resistor 114. The other end of resistor 114 is connected to ground through capacitor 115 and to amplifier 116, the ungrounded output of which is connected to phase shifter 109.

The ungrounded output of amplifier 112 is also connected to one side of primary winding 117 of transformer 118 through blocking capacitor 119. The other side of primary winding 117 is connected to voltage controlled oscillator 108. The secondary winding 120 of transformer 118 is connected to utilization device 121 which, for purposes of illustration, is shown to be a telephone transmitter and receiver.

The operation of transceiver 100 may best be understood by reference to FIG. 1. The modulated carrier, after having passed through a transmission medium in which the modulated carrier suffers significant phase shift, is received by transceiver 100 and transferred to phase comparator 105 through hybrid 101. The output of voltage controlled oscillator 108 is passed through phase shifter 109 before being applied to phase comparator 105 which produces an output proportional to the phase difference between the signals compared. Phase shifter 109 shifts the phase of the output of voltage controlled oscillator 108 in order to compensate for attenuation suffered in the transmission medium by the modulated carrier received by transceiver 100.

Phase comparator 105 produces an output which is proportional to the phase difference between the signals it compares. Initially, the phase shift suffered in the transmission medium by the modulated carrier is not compensated for by auxiliary control circuit 113. Therefore, initially, phase shifter 109 does not phase shift the output of voltage controlled oscillator 108. Phase comparator 105 produces an output which is passed through amplifier 110, low pass filter 111, and amplifier 112 to auxiliary control circuit 113. Phase comparator 105 essentially multiplies the signals it compares and produces both sum and difference components which are at high and low frequencies, respectively. The high frequency component is attenuated through low pass filter 111. Assuming initially that the modulating frequency of the carrier received by transceiver 100 is equal to the rest frequency of voltage controlled oscillator 108, a D.C. output will be produced by phase comparator 105. Capacitor 119 blocks this D.C. output from passing to voltage controlled oscillator 108. Since this D.C. voltage is representative of the phase shift suffered in the transmission medium, it is used to control phase shifter 109. The D.C. voltage which controls phase shifter 109 will compensate for the phase shift suffered in the transmission medium and will phase shift the output of voltage controlled oscillator 108 before it is applied to phase comparator 105.

If the carrier frequency of the modulated carrier received by transceiver 100 is different from the rest frequency of voltage controlled oscillator 108, phase comparator 105 will produce a varying output whose frequency is determined by the frequency difference between the carrier frequency of the modulated crrier and the rest frequency of voltage controlled oscillator 108. Assuming that this frequency difference is below voice frequencies, capacitor 119 will again effectively attenuate the initial output produced by phase comparator 105 and will block it from reaching voltage controlled oscillator 108.

After this initial "lock-in" period in which phase shifter 109 automatically compensates for the phase shift suffered by the modulated carrier received by transceiver 100, phase comparator 105 will produce an output which is representative of the signal carried by the modulated carrier. This signal will, in telephone transmission, be in the voice frequency range. Resistor 114 and capacitor 115 effectively serve to attenuate the voice frequencies and prevent it from reaching phase shifter 109 while capacitor 119 will pass the voice frequencies on to utilization device 121 and voltage controlled oscillator 108. The voice frequency information reaching voltage controlled oscillator 108 will cause it to shift its output phase to more clearly equal the phase of the signal carriel by the modulated carrier. Thus, transceiver 100, after the initial "lock-in," operates as a phase locked loop for voice frequencies.

Phase comparator 105 operates with maximum linearity and amplification when a predetermined phase difference exists between the signals it compares. Phase comparator 105 multiplies the signals it compares but is operated with maximum linearity since the predetermined phase difference is maintained. During operation the phase dfference between the compared signals varies but it remains small enough so as to maintain the phase comparator operating linearly and producing an output which is proportional to the phase difference of compared signals.

Figure 2:
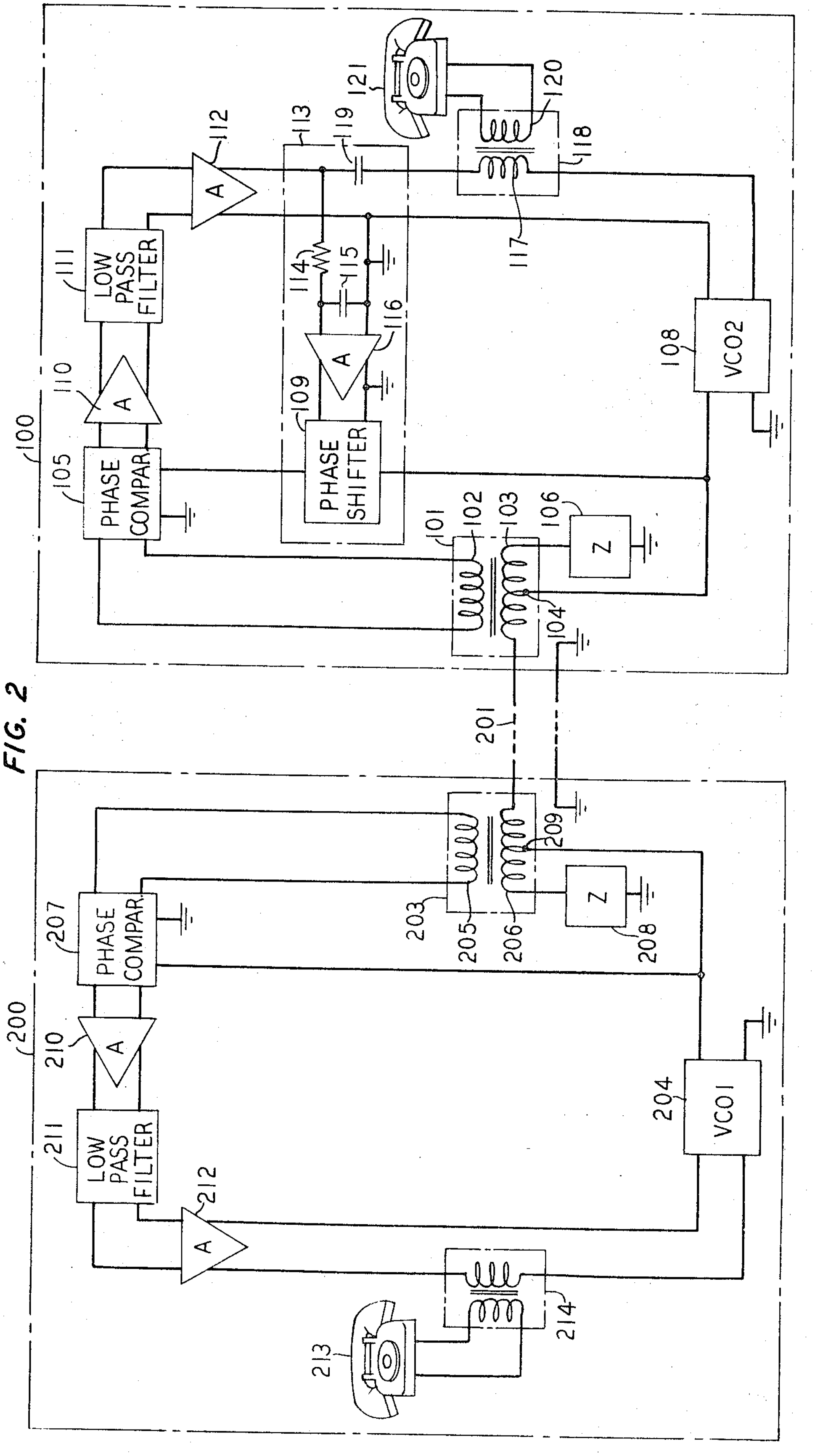
FIG. 2 is a block diagram of a bilateral transmission system employing the transceiver of FIG. 1.

FIG. 2 is a block diagram of a bilateral transmission system utilizing the principles of the present invention. A bilateral transmission system employing essentially phase locked loops at each end is set forth which may be employed where a modulated carrier suffers significant phase shift through the transmission medium. The bilateral transmission system comprises phase locked loop 200, transmission line 201, and transceiver 100. The operation of transceiver 100 has been set forth and fully explained in FIG. 1. Therefore, the same numerals as employed in FIG. 1 are employed in FIG. 2 for transceiver 100 in explaining its operation as part of the bilateral transmission system. Both phase locked loop 200 and transceiver 100 serve as transceivers in that each transmits and receives a modulated carrier using the same apparatus for both operations.

Since phase locked loop 200 serves as a transceiver, means are provided to separite its transmitted and received modulated carriers. Hybrid 203 which is part of phase locked loop 200, serves this separation function while insuring that the modulated carrier output of voltage controlled oscillator 204 will be transmitted to transceiver 100. The hybrid consists of primary winding 205 and secondary winding 206. Primary winding 205 is connected to phase comparator 207. One end of secondary winding 206 is connected to terminating impedance 208. The other end of secondary winding 206 is connected to transmission line 201. The secondary winding 206 is tapped at point 209, which is connected to voltage controlled oscillator 204. Hybrid 203 provides that the output of voltage controlled oscillator 204 received at tapped point 209 is transferred to transmission line 201 while not being transferred to primary winding 205. In addition, hybrid 203 insures that the signal received by phase locked loop 200 at secondary winding 206 is transferred to primary winding 205 while not being tranferred to voltage controlled oscillator 204. Therefore, the hybrid serves to separate the modulated carrier received from that transmitted by phase locked loop 200.

The modulated carrier received by phase locked loop 200 is applied to phase comparator 207, as is the output of voltage controlled oscillator 204. The output of phase comparator 207 is passed through the series connection of amplifier 210 and low pass filter 211. The output of low pass filter 211 is connected to amplifier 212, the output of which is supplied to utilization device 213 through transformer 214. For purposes of illustration, utilization device 213 is shown to be a telephone set which is capable of both transmitting and receiving voice signals. In addition, the output of amplifier 212 is, in part, supplied to voltage controlled oscillator 204.

The operation of phase locked loop 200 may best be understood with reference to FIG. 2. Phase comparator 207 produces an output proportional to the phase and frequency variations between the modulated carrier received by phase locked loop 200 and the output of voltage controlled oscillator 204. If a phase or frequency variation exists, a voltage will be developed at the output of phase comparator 207 which is fed back to voltage controlled oscillator 204 as a D.C. bias to adjust the output of voltage controlled oscillator 204 so that it is frequency synchronized with the signal received by phase locked loop 200.

Phase comparator 207 multiplies the signals it compares, but for purposes of the present invention, the product type phase comparator has a linear operation and may be considered to be a linear phase detector. The phase variation encountered in the present system may be small enough in order to maintain linear operation throughout the phase difference variation supplied to phase comparator 207.

Consequently, the output of amplifier 212 is proportional to the phase difference between the signals supplied to phase comparator 207. Since the information in the modulated carrier transmitted by transceiver 100 is carried in the phase of its modulated carrier, the output of amplifier 212 produces a signal which is proportional to the transmitted information. This output is supplied to utilization device 213 through transformer 214. For purposes of illustration, utilization device 213 is shown to be a telephone transmitter and receiver. In addition, a portion of the output of amplifier 212 is supplied to voltage controlled oscillator 204 as a feedback voltage so that the phase of the output produced by voltage controlled oscillator 204 may more nearly equal the phase of the modulated carrier transmitted by transceiver 100.

Phase locked loop 200 serves not only as a receiver but also transmits the signal emanating from utilization device 213. Voltage controlled oscillator 204 produces an output whose frequency is determined, in part, by the amplitude of the wave applied to the input of the voltage controlled oscillator. Thus, the output of utilization device 213 is applied to voltage controlled oscillator 204 through transformer 214 which will modulate the output of voltage controlled oscillator 204. The modulated carrier produced by voltage controlled oscillator 204 will be transmitted to transceiver 202 through transmission line 201 after passing through hybrid 203.

The bilateral transmission system in FIG. 2 comprises phase locked loop 200 and transceiver 100 interconnected by transmission line 201. The operations of phase locked loop 200 and transceiver 100 have been described above with a view to their being used in a bilateral transmission system as shown in FIG. 2. It is, therefore, unnecessary to repeat the detailed description of the operation of transceiver 100 since its operation was explained in detail with reference to FIG. 1.

The carrier initially transmitted by voltage controlled oscillator 108 may have a frequency which is different from the output of voltage controlled oscillator 204. Phase comparator 207 will produce an output proportional to this frequency difference which is used to control the frequency of the output of voltage controlled oscillator 204 in order to maintain synchronism between both voltage controlled oscillators. Synchronism between the frequencies of the signals produced by voltage controlled oscillators is maintained by a constant D.C. bias which is applied to voltage controlled oscillator 204. This modulated carrier is transmitted to transceiver 100 through transmission line 201. Since the frequency of voltage controlled oscillator 204 has been previously synchronized with the frequency of voltage controlled oscillator 108, phase comparator 105 produces an output which is representative of the signal source 213 because the information in a frequency modulated carrier is carried in the phase of its carrier. Since phase comparator 105 produces an output which is proportional to the phase difference between the signals it compares, and since prior to the modulation of the carrier wave by signal source 213, the signals compared by phase comparator 105 had the desired predetermined phase difference, the output of phase comparator 105 will be proportional to the additional phase shift which is representative of the signal emanating from signal source 213. This varying output from phase comparator 105 is passed through to utilization device 121 through capacitor 119 and transformer 118 as above described.

Since the phase comparators operate at maximum linearity, the system is linear throughout. Thus, when both signal sources are operated simultaneously, the principle of superposition may be applied, and phase comparator 105 will produce two distinct outputs. One is representative of the signal from source 213 and the other is representative of the signal from source 121. The utilization devices may be telephones, as shown, and under conditions of simultaneous talking, a person at utilization device 121 will hear the person at signal source 213, while also hearing his own voice in the telephone receiver. Since his own voice is heard anyway through other means when talking on the telephone, this additional feedback will not markedly interfere with the telephone conversation.

The system described in FIG. 2 automatically compensates for the phase shift encountered in the transmission medium. The compensation is automatic and no complex adjustments need be made in order to accomplish it. For example, when the bilateral transmission system shown in FIG. 2 is employed in a telephone system, phase locked loop 200 is installed at the central office and transceiver 100 is installed at the subscriber location. No adjustments need be made at the subscriber location in order to have accurate telephone transmission. In addition, it is clear that a large number of bilateral transmission systems may be employed in a telephone system where, for each subscriber equipped with a transceiver, there is a corresponding phase locked loop in the central office. Since the distance between the central office and each subscriber may vary, the phase shift suffered by the transmitted modulated carrier will also vary. But since the auxiliary control circuit compensates for a wide range of phase variations, the system described in FIG. 2 is well suited for this application.

Figure 3:
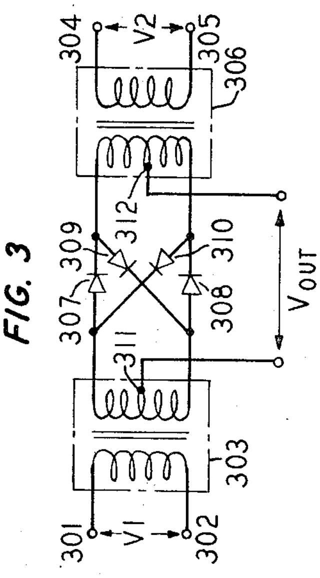
FIG. 3 is a schematic diagram of a phase comparator that may be used in embodiments of the present invention shown in FIGS. 1 and 2.

FIG. 3 is a schematic diagram of one type of phase comparator which may be used in embodiments of the present invention shown in FIGS. 1 and 2. A phase comparator which produces an output proportional to the phase difference of the signals compared by multiplying the compared signals may be used in embodiments of the invention shown in FIGS. 1 and 2. FIG. 3 is a ring modulator which is operated as a phase comparator. V1 which is applied to terminals 301 and 302 of transformer 303 represents the modulated carrier received by phase locked loop 200 or transceiver 100. V2 which is applied to terminals 304 and 305 of transformer 306 represents the output of voltage controlled oscillators 204 or 108 after having passed through phase shifter 109. One end of the secondary winding of transformer 303 is connected to one end of the secondary winding of transformer 306 through diode 307, while the other end of the secondary winding of transformer 303 is connected to the other end of the secondary winding of transformer 306 through diode 308. The anode ends of diodes 307 and 308 are connected to the secondary winding of transformer 303, while the cathode ends of diodes 307 and 308 are connected to the secondary winding of transformer 306. Diodes 309 and 310 complete the diode bridge network by having the anode ends of diodes 309 and 310 connected to the secondary winding of transformer 306 and the cathode ends of diodes 309 and 310 connected to the anodes of diodes 308 and 307, respectively. The secondary winding of transformer 303 may be tapped at point 311, while the secondary winding of transformer 306 may be tapped at point 312. The output of the ring demodulator shown in FIG. 3 is brought out from tapped points 311 and 312.

When the amplitude frequencies, and the phases V1 and V2 are equal, the output will be zero. For purposes of explanation, assume $V1_n$ is positive at terminal 301 and negative at terminal 302 and V2 is positive at terminal 304 and negative at terminal 305. Diodes 307 and 309 will be forward biased, thus completing a circuit path for the secondary winding of transformer 303. Diodes 309 and 308 will also be forward biased, thus completing a circuit path for the secondary winding of transformer 306. By tapping at the same points on the secondary windings of transformers 303 and 306, for example, at midpoints, the voltage difference between tapped point 311 and 312 will be zero. If a phase difference exists between the compared signals, a voltage difference would be produced between tapped points 311 and 312. Similarly, if a frequency difference existed between $V1_n$ and $V2_n$, the output of the ring demodulator would fluctuate as the phase difference between the compared signals was varying. The ring demodulator in operation serves to multiply the compared signals and produce an output.

Figure 4:
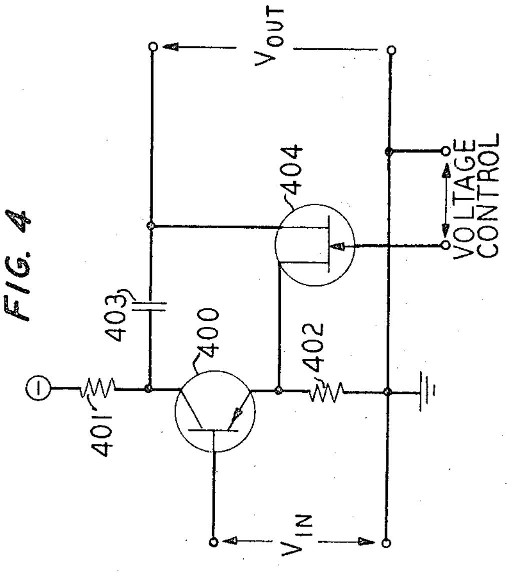
FIG. 4 is a schematic diagram of a phase shifter that may be used in embodiments of the present invention shown in FIGS. 1 and 2.

FIG. 4 is a schematic diagram of a phase shifter that may be used in the embodiments of the present invention shown in FIGS. 1 and 2. The output of voltage controlled oscillator 108 is represented as $V_{in}$ and the shifted input signal which is applied to phase comparator 105 is represented as $V_{out}$. The collector of PNP transistor 400 is connected to a biasing source of negative potential through resistor 401, while the emitter of PNP transistor 400 is connected to a point of reference potential through emitter resistor 402. A phase shifting network is connected to PNP transistor 400. One end of capacitor 403 is connected to the collector of transistor 400, while the other end of capacitor 403 is connected to the drain terminal of field effect transistor 404. The source terminal of field effect transistor 404 is connected to the emitter of transistor 400. The gate terminal of field effect transistor 404 is connected to a voltage control which represents the output of amplifier 116 in the auxiliary control circuit 113 in FIGS. 1 and 2. The field effect transistor is a device whose impedance from drain to source varies under control of the gate voltage. Thus the phase shifting network comprising capacitor 403 and field effect transistor 404 will vary its circuit response under the influence of the voltage control. Thus when the output of amplifier 116 in the auxiliary control circuit shown in FIGS. 1 and 2 increases, the phase shift added by the phase shifter shown in FIG. 4 will also increase since the output from amplifier 116 controls field effect transistor 404.

It is to be understood that the embodiments of the invention which have been described are merely illustrative of the application of the principles of the invention. Numerous modifications may readily be devised by those skilled in the art without departing from the spirit and scope of the invention.

What is claimed is:

1. A transceiver for transmitting and receiving a modulated carrier over and from a transmission medium comprising a phase comparator having an input connected to said transmission medium to receive an incoming signal, an oscillator having an input connected to a transmitting and receiving device and an output connected to said transmission medium to transmit a carrier wave which is modulated by a signal from said transmitting and receiving device, a phase shifter connected between said phase comparator and said oscillator to supply the output of said oscillator to said phase comparator, and means connecting the output of said phase comparator to said transmitting and receiving device, said phase shifter and said oscillator, said phase shifter being responsive to the output from said phase comparator so as to maintain a predetermined phase difference between the said incoming signal and the output of said oscillator.

2. A transceiver as set forth in claim 1 wherein said phase shifter includes at least one voltage sensitive variable impedance element whose impedance varies in response to the output voltage of said phase comparator.

3. A transceiver as set forth in claim 1 wherein said means connecting the output of said phase comparator to said oscillator includes a capacitor which passes the A.C. components having at least a frequency in the voice frequency range of the output of said phase comparator to said oscillator.

4. A bilateral transmission system comprising a first transceiver at one end and a second transceiver at the other end, said first and second transceivers being interconnected by a transmission medium which introduces a phase shift to a modulated carrier passing through said transmission medium, each of said first and second transceivers comprising a phase locked loop which includes a first phase comparator and a first oscillator in said first transceiver and a second phase comparator and second oscillator in said second transceiver, each of said first and second oscillators having its input connected with first and second transmitting and receiving devices, respectively, and an output connected to said transmission medium to transmit a carrier wave which is modulated by the signal from its said respective transmitting and receiving device, each of said first and second phase comparators having an input connected to said transmission medium to receive the transmission from the transceiver at the other end of said system, means connecting the output of said first oscillator to said first phase comparator, means including said first transmitting and receiving device connecting the output of said first phase comparator to the input of said first oscillator to control the phase of said first oscillator, a phase shifter in said phase locked loop of said second transceiver connected to supply the output of said second oscillator to said second phase comparator, and means connecting the output of said second phase comparator to said phase shifter, said second transmitting and receiving device, and said second oscillator, said phase shifter being responsive to the output from said second phase comparator so as to maintain a predetermined phase difference between the incoming signal to said second phase comparator and the output of said second oscillator.

5. A bilateral transmission system as set forth in claim 4 wherein said phase shifter includes at least one voltage sensitive variable impedance element whose impedance varies in response to the amplitude of the output of said second phase comparator.

6. A bilateral transmission system as set forth in claim 4 wherein said means connecting the output of said second phase comparator to said second transmitting and receiving device and said second oscillator includes a capacitor which passes the A.C. components having at least a frequency in the voice frequency range of the output of said second phase comparator to said second oscillator.

7. A bilateral transmission system as set forth in claim 4 wherein said first and second transmitting and receiving devices connected respectively to the inputs of said first and second oscillators are individual telephone transmitters and receivers.

References Cited

UNITED STATES PATENTS

| | | | |
|---|---|---|---|
| 2,846,572 | 8/1958 | Elliott | 325—17 |
| 3,036,210 | 5/1962 | Lehan et al. | 325—15 |
| 3,102,164 | 8/1963 | Roiz | 178—69.5 |
| 3,195,049 | 7/1965 | Altman et al. | 325—305 |
| 3,444,471 | 5/1969 | French | 325—304 |

RICHARD MURRAY, Primary Examiner

B. V. SAFOUREK, Assistant Examiner

U.S. Cl. X.R.

178—69.5; 179—2.5; 325—17, 63; 328—155; 331—10; 343—180